S. GOLDSTEIN.
AUTOMOBILE SIGNAL CASING.
APPLICATION FILED DEC. 27, 1920.
1,385,913.
Patented July 26, 1921.
2 SHEETS—SHEET 1.
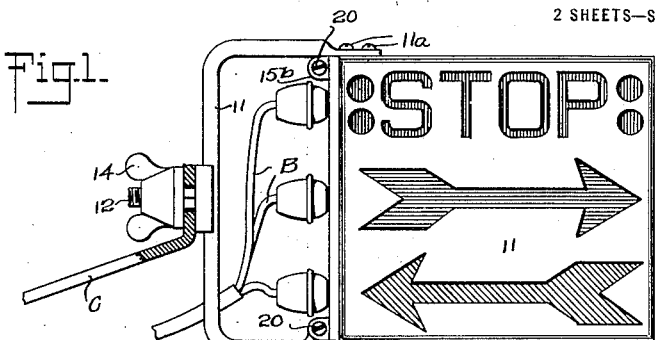
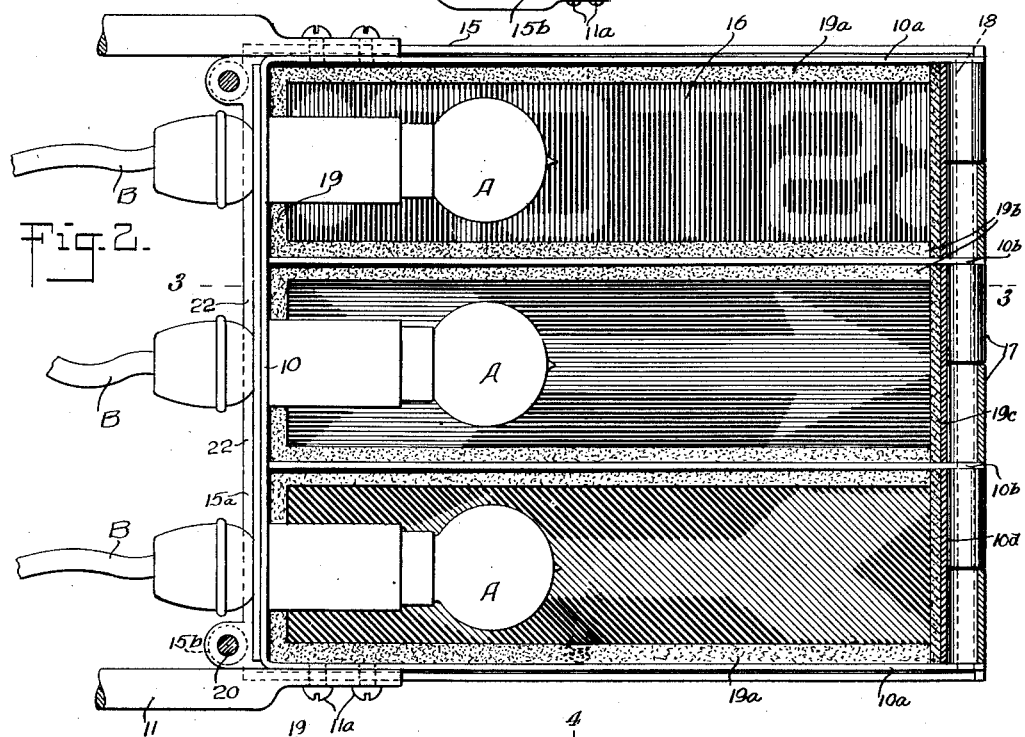
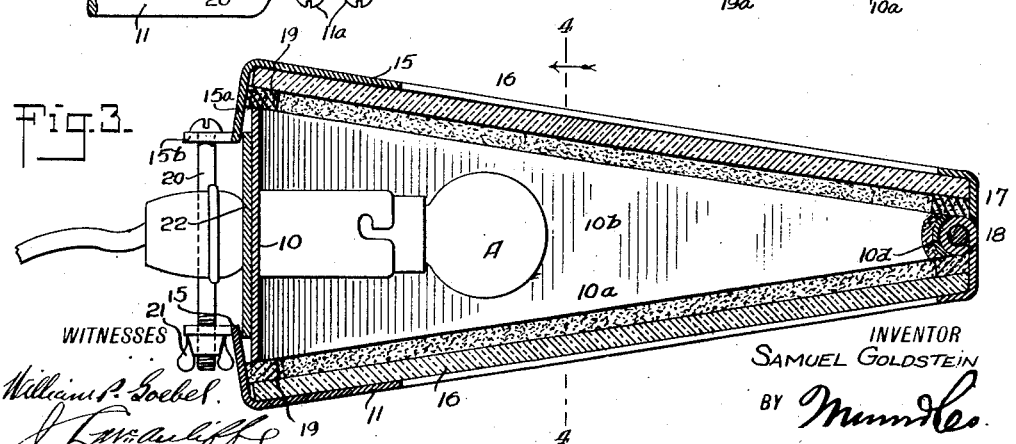
WITNESSES
INVENTOR
SAMUEL GOLDSTEIN
ATTORNEYS S. GOLDSTEIN.
AUTOMOBILE SIGNAL CASING.
APPLICATION FILED DEC. 27, 1920.
1,385,913.
Patented July 26, 1921.
2 SHEETS—SHEET 2.
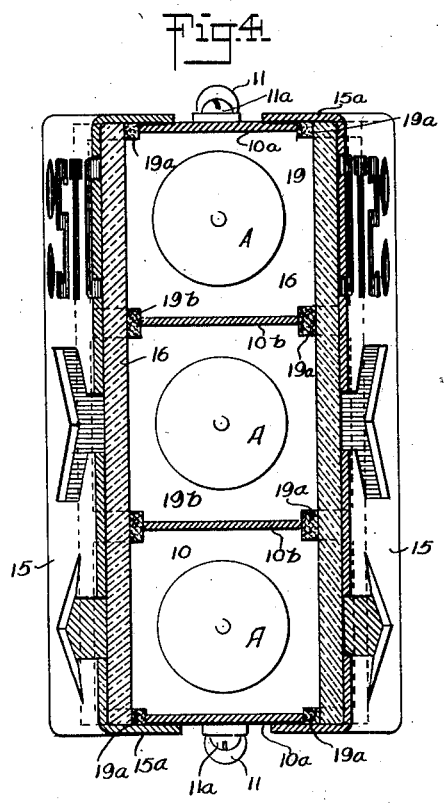
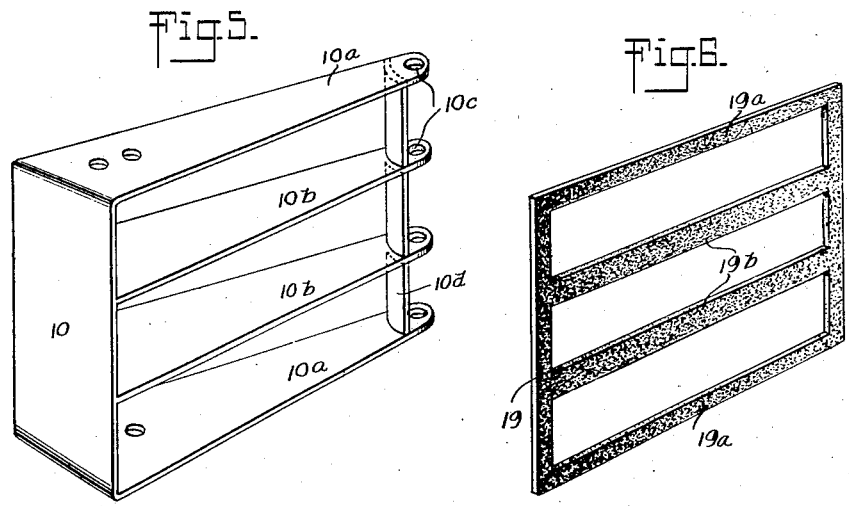
WITNESSES
INVENTOR
SAMUEL GOLDSTEIN
BY
ATTORNEYS

UNITED STATES PATENT OFFICE.

SAMUEL GOLDSTEIN, OF NEW YORK, N. Y.

AUTOMOBILE-SIGNAL CASING.

1,385,913.     Specification of Letters Patent.     Patented July 26, 1921.

Application filed December 27, 1920. Serial No. 433,363.

*To all whom it may concern:*

Be it known that I, SAMUEL GOLDSTEIN, a citizen of the United States, and a resident of the city of New York, borough of Manhattan, in the county of New York and State of New York, have invented a new and Improved Automobile-Signal Casing, of which the following is a description.

My invention relates to signals for vehicles and more particularly for motor-driven vehicles and specially has reference to a signal to indicate to a vehicle in the rear the direction the vehicle in front is about to take in turning; as well as a "stop" signal.

The invention is designed as an improvement on the type of signal casing of which an example is disclosed in my application for patent filed June 5, 1920, Serial No. 386,752.

The general object of the invention is to provide a signal of the indicated character improved in various particulars with respect to convenience with which access may be had to parts for examination, repair, or renewal, and to provide a signal that will be visible to those approaching at an angle as well as those directly in front or in the rear.

More specifically, the object of the present invention is to provide a simplified casing structure, as well as simple means for making the several chambers of the casing light-tight and water-tight.

Reference is to be had to the accompanying drawings forming a part of this specification, it being understood that the drawings are merely illustrative of one example of the invention.

Figure 1 is a side elevation of a signal embodying my invention;

Fig. 2 is an enlarged longitudinal vertical section;

Fig. 3 is a horizontal section on the line 3—3, Fig. 2;

Fig. 4 is a transverse vertical section on the line 4—4, Fig. 3;

Fig. 5 is a perspective view of the frame unit to be particularly referred to;

Fig. 6 is a perspective view of a removable felt mat coacting with the frame unit for making the light chambers light-tight.

In carrying out my invention in accordance with the illustrated example, a casing or frame unit 10 is provided, having means to support it on a fixed part of the vehicle, there being shown for the purpose a yoke 11 secured to the casing, at one end, as by screws $11^a$, and having a stud 12 provided with a washer and nut 13, 14 for securing the casing to any fixed part by means of bracket C.

The sides 15 of the casing 10 converge toward the outer end so that the casing is generally of triangular form in horizontal section and said sides have transpicuous signal means, such as glass or equivalent panels 16 glued or otherwise fixed to the sides 15 at the interior, the sides 15 having openings at the several compartments in the form of signal legends or symbols, there being shown the word "stop" at one glass panel and compartment and reverse arrows at the other panels and compartments.

Each side 15 of the casing is swingably mounted for which purpose in the illustrated example, alternate hinge knuckles 17 are formed on the respective sides and held by a hinge pin 18 passing through holes $10^c$ in the members of the frame unit 10 at the outer convergent end of the latter.

Said frame unit 10 includes tapering arms $10^a$ at the top and bottom and intermediate spaced tapering arms $10^b$ therebetween to constitute partitions and form a plurality of compartments, there being three compartments in the present instance, each having a suitable source of light, such as electric lamps A. The side edges of the members $10^a$, $10^b$ are presented to the hinged sides 15 of the casing so that the glass panels are disposed in front of the respective compartments. To coact with the members $10^a$, $10^b$ of the frame unit in excluding light from the compartments, I provide a mat 19 of felt or other soft material at each side 15 at the interior. Said mats include end cross pieces as well as longitudinal side members $19^a$ at the top and bottom and intermediate longitudinal members $19^b$ corresponding in position with the arms $10^a$, $10^b$ of the frame unit 10. The longitudinal members $19^a$, $19^b$ of the mat present broad surfaces to lie at each side of the members $10^a$, $10^b$ and with the closing of a side 11, the longitudinal members of its mat 19 will be brought firmly against the opposed edges of the arms $10^a$, $10^b$ which will embed themselves in the felt or equivalent material. In addition to the felt mat 19, I provide frame 10 with spacing and strengthening members $10^d$ between the respective arms $10^a$, $10^b$, said spring members being arcuate in cross section to correspond with the curvature of the hinge knuckles 17. On said spacing members 10$^d$ I secure felt covering 19$^e$ in each of the compartments, the cross bars of the mat 19 extending along the edges of said felt covering 19$^e$.

The letter B indicates the conductor wires leading to the respective lamps A, the circuit through the conductor wires being controlled in practice by a suitable switch not here shown, there being illustrated, however, in my application above referred to and in an application filed concurrently herewith switches for the purpose.

To hold the sides 15 in the closed position said sides are formed with inturned flanges 15$^a$ at the wider end of the casing, said flanges terminating in rearwardly disposed members 15$^b$ secured by screw bolts 20 and suitable nuts 21 or equivalent means. Also, the frame unit 10 at the bent or bight thereof may as shown have a strengthening plate 22.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. An automobile signal casing including a frame unit substantially triangular in cross section to present sides convergent toward one end, swingable sides hingedly mounted on said frame at said end, said frame presenting a plurality of spaced arms tapering toward the convergent end of the casing and forming partitions dividing the casing into separate compartments adapted to receive a source of light, and mats of yieldable material carried by said hinged sides of the casing to swing therewith and presenting longitudinal members corresponding in positions with the positions of said frame arms and adapted to contact with said arms when the sides are in closed position to thereby make the respective compartments light-tight.

2. An automobile signal casing convergent toward one end and including a frame unit in said casing presenting spaced approximately parallel arms tapering toward said end of the casing to divide the casing into compartments, as well as sides hinged to said frame unit at said end, and bracing and spacing members on said frame unit between the arms thereof at said end and curved transversely into conformity with the hinge means.

3. An automobile signal casing including a frame unit substantially triangular in cross section to present sides convergent toward one end, swingable sides hingedly mounted on said frame at said end, said frame presenting a plurality of spaced arms tapering toward the convergent end of the casing and forming partitions dividing the casing into separate compartments adapted to receive a source of light, and mats of yieldable material carried by said hinged sides of the casing to swing therewith and presenting longitudinal members corresponding in positions with the positions of said frame arms and adapted to contact with said arms when the sides are in closed position to thereby make the respective compartments light-tight, and a light-tight covering in said casing at the interior of the hinge means.

4. An automobile signal casing convergent toward one end and including a frame unit presenting spaced approximately parallel arms tapering toward said end to divide the casing into compartments, as well as sides hinged to said frame unit at said end, and bracing and spacing members on said frame unit between the arms thereof at said end and curved transversely into conformity with the hinge means; together with means on the hinged sides to yieldingly engage the side edges of said frame arms to make the respective compartments light-tight.

SAMUEL GOLDSTEIN.